United States Patent Office 3,327,815
Patented June 27, 1967

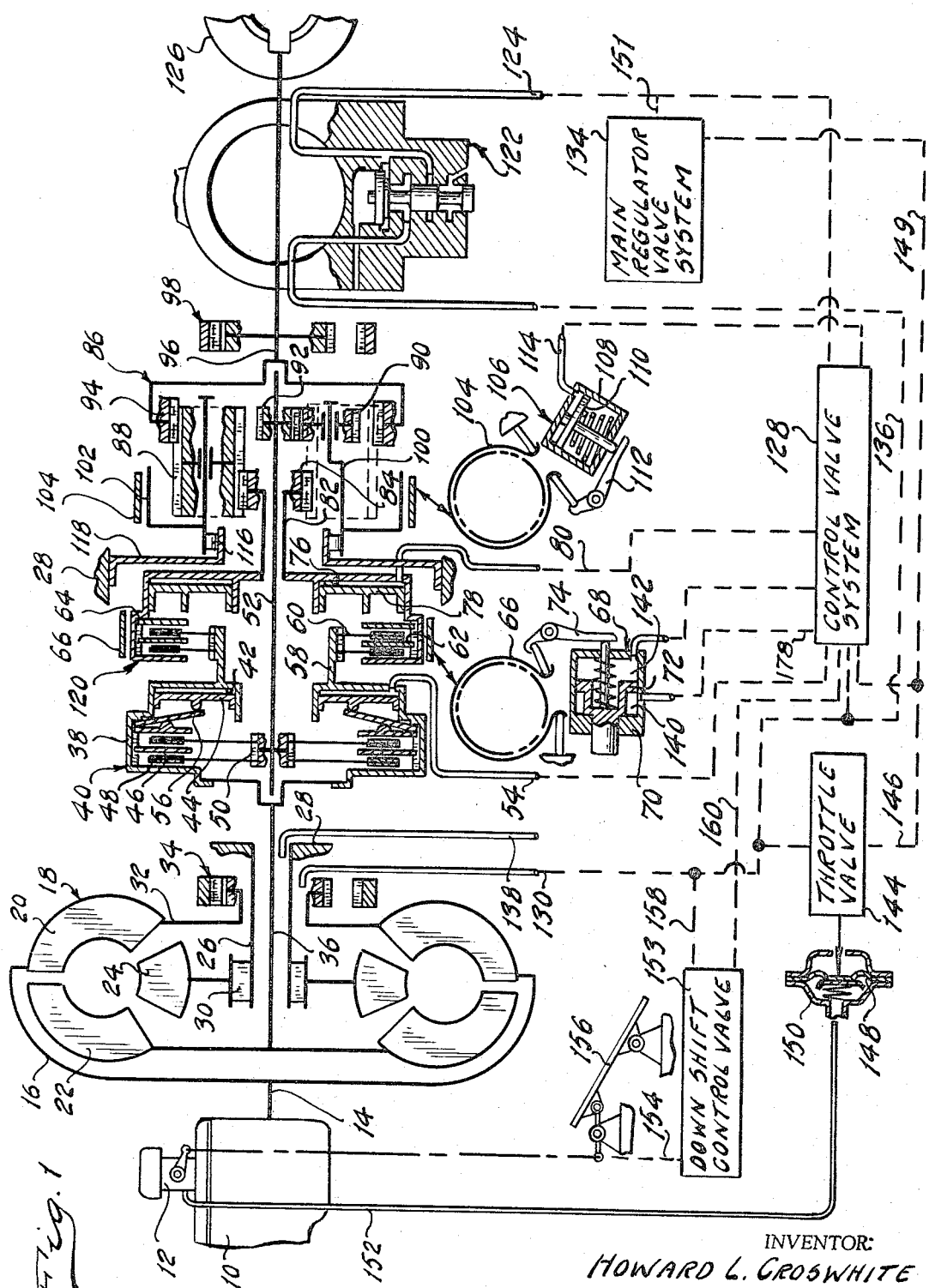

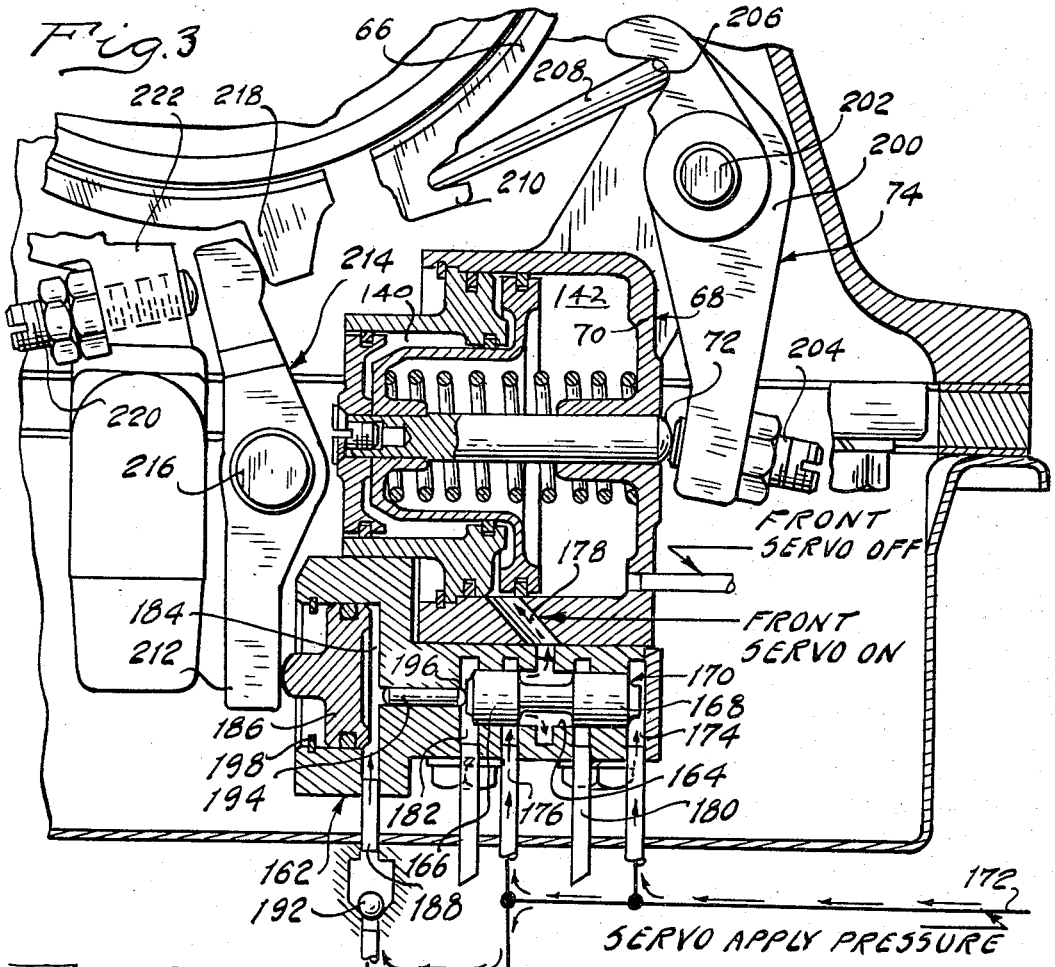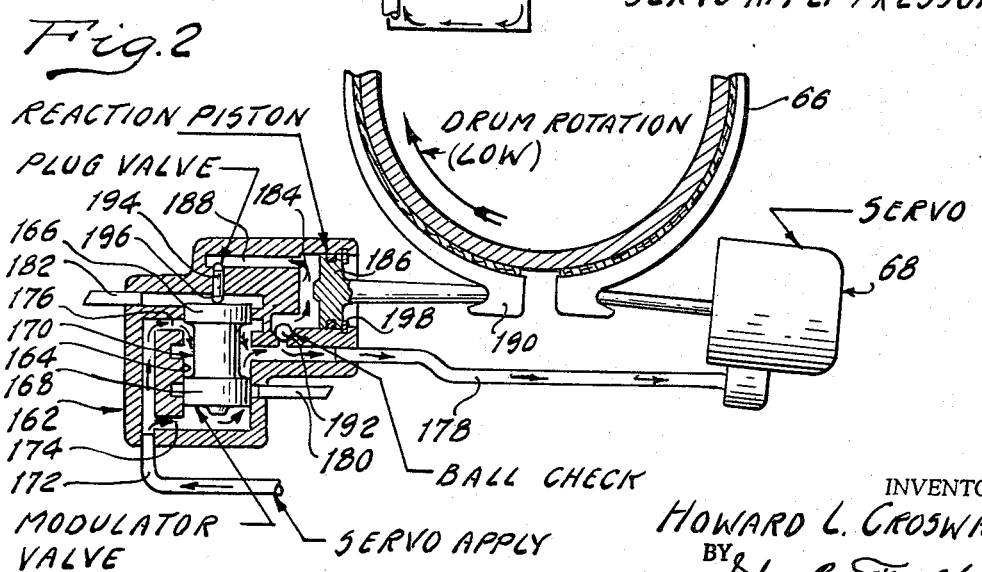

3,327,815
BRAKE SERVO WITH CONTROLLED REACTION
Howard L. Croswhite, Livonia, Mich., assignor to The Ford Motor Company, Dearborn, Mich., a corporation of Delaware
Filed June 9, 1965, Ser. No. 462,613
6 Claims. (Cl. 188—152)

My invention relates generally to fluid pressure operated brake servos, and more particularly to an automatically controlled fluid pressure operated brake servo for use in a multiple speed ratio gear system.

The improvements of my invention can be applied to planetary gearing in an automotive vehicle driveline system having three forward driving speed ratios. In such a system, the lowest speed ratio is obtained by applying a first reaction brake as torque is delivered to a power input element of the gearing. The reaction brake provides a reaction point for the gearing so that torque multiplication can occur. A speed ratio shift from the lowest speed ratio to the intermediate speed ratio is accomplished by engaging a second reaction brake as the first reaction brake is disabled. Torque is applied continuously to a power input element of the gearing through a first selectively engageable friction clutch.

Finally, a speed ratio shift from the intermediate speed ratio to a direct drive high speed ratio can be obtained by disabling both reaction brakes and applying a second friction clutch which cooperates with the first clutch to cause the elements of the gearing to rotate together in unison with a 1:1 speed ratio.

In order to provide a smooth speed ratio shift from the low speed ratio to the intermediate speed ratio, the rate of application of the second brake should be modified so that the full engaging pressure is not applied to the servo instantaneously. In a preferred embodiment of my invention, an overrunning brake is used for anchoring the first reaction element of the gearing during operation of the gearing in the lowest speed ratio. It therefore is necessary only to apply the second speed ratio brake to effect an automatic speed ratio change. The overrunning brake will freewheel as the capacity of the intermediate speed ratio brake increases.

It is an object of my invention to provide an automatic power transmission system wherein a speed ratio change from a first underdrive ratio to a second underdrive ratio can be accomplished with a high degree of smoothness by applying an intermediate speed ratio reaction brake and by controlling the capacity of the brake servo thereby providing a controlled degree of reaction in the gearing.

It is a further object of my invention to provide a brake servo of the type above set forth wherein a modulator valve system is incorporated in the servo pressure feed passages for modifying the clutch and servo pressure so that the resultant pressure made available to the servo is related functionally to the degree of reaction.

It is a further object of my invention to provide a brake servo of the type above set forth and which includes a modulator valve system that functions to modulate the pressure of the servo to produce a relatively constant reaction.

It is a further object of my invention to provide an automatic power transmission system wherein a speed ratio change from one ratio to another can be accomplished with a maximum degree of smoothness as inertia forces are reduced.

For the purpose of describing my invention more particularly, reference will be made to the accompanying drawings, wherein:

FIGURE 1 shows in schematic form a gearing system for an automatic power transmission mechanism in an automotive vehicle driveline;

FIGURE 2 shows in schematic form a brake servo for use in the gearing mechanism of FIGURE 1; and FIGURE 3 is a view partly in section showing one physical embodiment of my invention.

Referring first to FIGURE 1, numeral 10 designates an internal combustion vehicle engine in an automotive vehicle driveline. The engine includes an air-fuel mixture intake manifold which is supplied with an air-fuel mixture by a carburetor 12.

The crankshaft 14 of the engine 10 is connected drivably to the impeller shell 16 of a hydrokinetic torque converter 18. The converter 18 includes an impeller 20, a turbine 22 and a stator 24. The impeller 20 comprises in part the shell 16. Each of the members 20, 22 and 24 of the converter 18 is bladed. The blades define toroidal fluid flow passages in a common torus circuit.

Stator 24 is mounted for one-way rotation upon a stationary sleeve shaft 26 which is connected directly to the relatively stationary transmission housing. An overrunning brake 30 is situated between the stator 24 and the shaft 26 to provide one-way braking action.

The impeller shell 16 is formed with a hub 32 that is connected directly to a positive displacement front pump 34. This pump acts as a pressure source for a control valve system, a portion of which will be described subsequently.

Turbine 22 is connected to a turbine shaft 36 which in turn is connected directly to a clutch drum 38 for a forward drive clutch 40. Drum 38 defines an annular cylinder 42 within which is situated an annular piston 44. The cylinder 42 and piston 44 define a servo for the forward clutch 40.

Clutch 40 includes externally splined friction discs 46 which are carried by internally splined portions of the drum 38. Internally splined discs 48 are situated in interdigital relationship with respect to the discs 46. They are splined to an externally splined portion 50 of an intermediate shaft 52.

Fluid pressure is distributed to the servo for the clutch 40 through a feed passage 54. This creates a pressure force on the piston 44 which is transmitted through a Belleville spring washer 56 to the discs 46 and 48 thereby establishing a direct connection between shaft 36 and shaft 52. Belleville spring disc 56 acts both as a lever for multiplying the piston force applied to the friction discs and as a return spring for returning the piston 44 to a clutch releasing position after passage 54 is exhausted.

The clutch drum 38 is formed with an externally splined clutch element 58 which carries internally splined friction discs 60. These discs 60 are situated in interdigital relationship with respect to externally splined discs 62 carried by a brake drum 64. An intermediate speed ratio brake band 66 surrounds the drum 64. It may be applied and released by means of a servo indicated schematically at 68.

Servo 68 includes a servo cylinder 70 within which is positioned a servo piston 72. A motion transmitting linkage 74 is adapted to transmit to the operating end of the band 66 the forces applied to the piston 72.

Drum 64 defines an annular cylinder 76 within which is situated an annular piston 78. Cylinder 76 and piston 78 cooperate to define a servo pressure chamber that is supplied with working pressure through a feed passage 80. When pressure is introduced to the cylinder 76 the clutch discs 60 and 62 become frictionally engaged.

Drum 64 is connected to a first sun gear 84 by means of a sleeve shaft 82. The sun gear 84 forms a part of a compound planetary gear unit 86 which includes also a set of long planet pinions 88, a set of short planet pinions 90, a second sun gear 92 which meshes with pinions 90, and a ring gear 94 which meshes with pinions 88. Pinions 90 and pinions 88 mesh also with each other. Sun gear 84 meshes with planet pinions 88.

Ring gear 94 is connected directly to power output shaft 96. A positive displacement rear pump 98 is driven by the shaft 96. This pump cooperates with pump 34 to provide a fluid pressure source for the valve system.

Planetary gear unit 86 includes also a carrier 100 upon which pinions 90 are journaled. Pinions 88 also are journaled on the carrier 100 at angularly spaced locations with respect to the location of pinions 90.

A brake drum 102 is defined by the carrier 100. The brake band 104 surrounds drum 102. It may be applied and released by means of a fluid pressure operated servo 106. This servo includes a cylinder 108 within which is positioned a servo piston 110. A motion transmitting linkage 112 transfers the force applied to the piston 110 to the operating end of the brake band 104. The reaction end of the brake band 104 is anchored to the transmission housing.

A feed passage 114 supplies working pressure to the working chamber defined by the cylinder 108 and the piston 110.

An overrunning brake for anchoring the carrier 100 is shown in part at 116. It includes overrunning brake elements in the form of rollers which are situated between an outer race defined by the carrier 100 and an inner race which is carried by a stationary wall 118. The wall 118 in turn is connected to the transmission housing. This housing is generally indicated at 28 in FIGURE 1.

The rear clutch of which discs 62 and 64 form a part is identified generally by reference character 120. The brake band 66, which surrounds the drum 64 for the clutch 120, is operated by means of a servo that is capable of embodying the improvements of my invention.

A governor 122 is connected directly to the power output shaft 96. It forms a source of a pressure signal that is related functionally in magnitude to the driven speed of shaft 96. Governor 122 is fed with control pressure through a passage 136. The pressure signal is delivered from the valve 122 through a governor pressure delivery passage 124. This signal is utilized by a valve system which will be described.

Shaft 96 is connected to the traction wheels 126 for the vehicle through a suitable driveline and differential and axle assembly.

To establish low speed ratio, forward drive operation, it merely is necessary to engage the forward clutch 40. The torque converter 18 multiplies the torque of the engine 10 so that the resultant turbine torque developed by turbine 22 is transferred through shaft 36 and through the applied clutch 40 to the shaft 52. Sun gear 92 is driven by shaft 52. Sun gear 92 drives pinions 90 which in turn drive pinions 88. Since carrier 100 is anchored by the overrunning brake shown in part at 116, pinions 88 tend to drive ring gear 94 and power output shaft 96 in the direction of rotation of shaft 52 but at a reduced speed relative to the speed of shaft 52.

The gearing functions during low speed ratio, forward drive operation to deliver torque in one direction only. Coasting torque delivery from the traction wheels 126 to the engine cannot be obtained since the overrunning brake shown in part at 116 will freewheel. If coast braking is desired, provision may be made for applying brake band 104. This acts as a reaction point for the carrier 100 so that torque can be delivered from power output shaft 96 to shaft 36 through the gearing.

Intermediate speed ratio operation can be obtained by applying brake band 66 as clutch 40 remains applied. Turbine torque from turbine 22 then is delivered from shaft 36 through the clutch 40 to the shaft 52. Brake band 66 anchors sun gear 44 so that the latter serves as a reaction point. Thus the long planet pinions 88 will tend to revolve about the sun gear 40 thus causing the carrier 100 to rotate about the axis of the shaft 52. The overrunning brake shown in part at 116 freewheels to permit this motion of the carrier to take place. Thus the ring gear 94 and the power output shaft 96 are driven at an increased speed ratio that is greater than the lowest speed ratio but less than unity.

To establish a speed ratio change from the intermediate speed ratio to a direct drive, high speed ratio, brake band 66 is released and both clutches 40 and 120 are applied. This causes the sun gear 84 to become clutched directly to sun gear 92. Thus the elements of the gearing rotate in unison with a 1:1 speed ratio.

To establish reverse drive operation clutch 40 is released and clutch 120 is applied, brake 66 is released and brake 104 is applied. Under these conditions turbine torque is delivered directly to the sun gear 84 since clutch 120 establishes a driving connection between drum 64 and shaft 36. The carrier 100 acts as a reaction member since it is held stationary by brake band 104. With sun gear 84 acting as a power input element, the ring gear 94 is driven in a reverse direction. This reverse motion is transferred to power output shaft 96.

The speed ratio changes can be obtained by controlling automatically the distribution of pressure to the various clutch and brake servos. This is accomplished by a control valve system indicated schematically in FIGURE 1 by reference character 128. This valve system is supplied with fluid pressure from the positive displacement pumps through a passage indicated at 130. The pressure in the passage 130 is regulated by means of a main regulator valve system shown at 134. Fluid is returned from the valve system through a flow return passage 138 to the low pressure side of the positive displacement pumps. This passage 138 then communicates also with the lubrication passage system in the transmission mechanism.

The servo 68 includes a pair of opposed pressure chambers 140 and 142 situated on opposite sides of the piston 72. Each of these pressure chambers communicates with the control valve system, the latter acting to distribute selectively pressure to each pressure chamber to apply and to release the servo 68.

A throttle valve 144 supplies a pressure signal to both the control valve system 128 and the regulator valve system 134, passages 146 and 149 being provided for this purpose. Each throttle valve is actuated by a manifold pressure sensitive servo that includes a flexible diaphragm 148 in a housing 150. The housing 150 and the diaphragm 148 define a chamber that is in communication with the engine intake manifold through a manifold pressure passage 152. The throttle valve thus produces a signal in passage 146 that is related functionally in magnitude to engine manifold vacuum. The control valve system responds to changes in the pressure signals made available by the governor valve 122 and the throttle valve 144 to produce automatic speed ratio changes.

The automatic control valve system can be overruled by a downshift control valve 153. This includes a downshift valve element that is connected mechanically to the engine carburetor throttle valve that in turn is controlled by a driver operated accelerator pedal 156. If the driver demands a high engine torque for acceleration purposes, the downshift valve will cause the control valve system to assume an underdrive condition. The downshift control valve is supplied with pressure from passage 130 through passage 158. It delivers the downshift control valve signal through passage 160 to the control valve system.

In FIGURE 2, I have shown schematically a valve arrangement for establishing a constant reaction shift from the low speed ratio to the intermediate speed ratio. This valve system includes a valve body 162 within which is formed a valve chamber 164. Slidably disposed in chamber 164 is a modulator valve having spaced annular valve lands 166 and 168. The modulator valve is identified generally by reference character 170.

During the interval of a shift from the low speed ratio to the high speed ratio the control valve system 128 delivers control pressure to the valve body 162 through a passage 172. This passage communicates with a first pressure port 174 formed in the lower end of the chamber 164. It communicates also with a pressure port 176 located adjacent the upper end of the chamber 164. A pressure passage 178 extends from the apply side of the servo 68 to the valve chamber 164. It communicates with the valve chamber 164 at a location intermediate valve lands 166 and 168. Passage 178 communicates with the chamber 140 of the servo 68.

An exhaust port 180 communicates with chamber 164 at a location adjacent land 168. Another exhaust port 182 communicates with chamber 164 at its upper end.

Valve body 162 defines a reaction cylinder 184. Located in the cylinder 184 is a reaction piston 186. Piston 186 and cylinder 184 cooperate to define a pressure cavity that communicates with an internal passage 188 formed in the body 162.

Piston 186 is connected mechanically to the anchored end 190 of brake band 66. The operating end of the brake band 66 is connected mechanically to the piston 72 of the servo 68, as explained previously.

The pressure chamber defined by the piston 186 and the cylinder 184 is in communication with passage 178 through a one-way ball check valve 192. Valve 192 is capable of delivering pressurized fluid from passage 178 to the cavity behind piston 186. It inhibits distribution of pressurized fluid from the cavity to passage 178.

A secondary valve chamber 194 is formed in valve body 162. The principal axis of chamber 194 extends in the direction of the principal axis of chamber 164. Slidably disposed in the chamber 194 is a plug valve 196. One end of the plug valve communicates with passage 188 so that it is in communication with the cavity behind piston 186. The other end of the chamber 194 is exhausted through the exhaust port 182. The other end of the plug valve 196 contacts one end of the modulator valve 170.

During a speed ratio change from the low speed ratio to the high speed ratio, control pressure is distributed to passage 172 by the control valve system 128. This pressure immediately acts upon the lower surface of land 168 thus shifting the valve spool 170 in an upward direction as viewed in FIGURE 2. This causes land 166 to uncover port 176. Passage 172 then is brought into direct communication with passage 178. Control pressure then is delivered directly to the apply side of the intermediate servo 68. At this time pressure chamber 142 of the servo 68 is exhausted through the control valve system 128.

As soon as pressure is developed in passage 178, a corresponding pressure build-up begins to occur in pressure chamber 140 of the servo 68. Before the servo piston can be stroked to a brake applying position, check valve 192 establishes communication between passage 178 and the cavity behind piston 186. Thus this cavity becomes pressurized with the same pressure that pressurizes passage 178. The reaction piston 186 then is shifted in a right-hand direction as viewed in FIGURE 2 until its motion is stopped by a snap ring 198.

As the piston 186 seats against the snap ring 198, the pressure build-up in chamber 140 increases. A brake applying force then is distributed to the operating end of brake band 66. This creates a torque reaction on the anchored end 190 of the brake band 66. This torque reaction tends to urge the reaction piston 186 in a left-hand direction, which causes the pressure in the cavity behind the piston 186 to increase.

This increased pressure in the reaction piston cavity acts upon the upper end of the plug valve 196. The resulting force is transmitted directly to the modulator valve 170. This force opposes the upwardly directed force acting upon the valve element 170. Thus the degree of communication between port 176 and passage 178 tends to decrease as the degree of communication between passage 178 and exhaust port 180 tends to increase. This results in a modified or reduced pressure in passage 178. The magnitude of the modification or reduction of the pressure in passage 178 is determined by the magnitude of the pressure behind the reaction piston 186. The magnitude of this pressure in turn is determined by the torque reaction of the brake band 66.

The reaction torque made available by the brake band thus is limited to a predetermined value that is dependent upon line pressure at the time the shift is initiated and upon the calibration of the valve element 170 and the plug valve 196.

As the brake capacity increases, the drum 64 decelerates. The effective coefficient of friction then trends to increase which, of course, tends to increase the torque reaction. The modulator valve, however, tends to compensate for any increase in torque reaction. In doing this the tendency for the brake band to grab the drum is reduced and the shift from the low speed ratio to the intermediate speed ratio occurs smoothly.

I thus have provided a valve system for use with a brake servo which functions to modify the servo capacity to compensate for changes in the coefficient of friction of the friction material that is used.

In FIGURE 3 I have illustrated an actual working embodiment of my invention. The mechanical connection 74 between the piston 72 of the servo 68 and the operating end of the brake band 66 comprises a lever 200 that is mounted upon a pivot shaft 202. Shaft 202 in turn can be carried by the stationary housing.

The piston 72 engages an adjusting screw 204 carried by the adjacent end of the lever 200. The effective stroke of the piston 72 can be controlled by appropriately adjusting the screw 204. The other end of the lever 200 is recessed as shown at 206. A strut 208 is interposed between the recess 206 and a recessed boss 210 carried by the operating end of the band 66.

The reaction piston 186 engages one end 212 of a reaction lever 214. This lever is pivoted on a pivot shaft 216. The other end of the lever 214 engages a reaction boss 218 formed on the reaction end of the band 66. The forces applied to the piston 186 are transferred through the reaction lever 214 to the boss 218 thereby providing a reaction point for the brake band during a speed ratio shift. An adjusting screw 220 is threadably received with a boss 222 situated adjacent the boss 218.

The upper end of the lever 214 rotates in a counterclockwise direction as viewed in FIGURE 3 under the influence of the reaction force on the boss 218 until it contacts the adjusting screw 220. Movement of the lever 214 is limited in this fashion. As soon as the screw 220 is engaged, the reaction piston 186 no longer functions as a reaction point and modulation of the modulator valve element 170 ceases. Full engaging pressure thereafter is applied to passage 178.

Having thus described a preferred form of my invention, what I claim and desire to secure by U.S. Letters Patent is:

1. In a friction brake adapted to anchor selectively a torque delivery element in a torque delivery gear system, a fluid pressure servo comprising a cylinder, a piston disposed in said cylinder and cooperating therewith to define a pressure chamber, a brake band surrounding a reaction element of said gear system, a connection between said piston and one end of said brake band, passage means for distributing control pressure to said chamber, modulator valve means disposed in and partly defining said passage means for controlling the rate of pressure build-up in said chamber, a reaction piston, a reaction cylinder receiving said reaction piston and cooperating therewith to define a reaction pressure cavity, said cavity being in fluid communication with pressure sensitive portions of said modulator valve means, and means for transferring reaction force from the other end of said brake band to said reaction piston whereby the pressure in said reaction piston cavity is proportional to the torque reaction of said brake band.

2. In a friction brake adapted to anchor selectively a torque delivery element in a torque delivery gear system, a fluid pressure servo comprising a cylinder, a piston disposed in said cylinder and cooperating therewith to define a pressure chamber, a brake band surrounding a reaction element of said gear system, a connection between said piston and one end of said brake band, passage means for distributing control pressure to said chamber, modulator valve means disposed in and partly defining said passage means for controlling the rate of pressure build-up in said chamber, a reaction piston, a reaction cylinder receiving said reaction piston and cooperating therewith to define a reaction pressure cavity, said cavity being in fluid communication with pressure sensitive portions of said modulator valve means, means for transferring reaction force from the other end of said brake band to said reaction piston whereby the pressure in said reaction piston cavity is proportional to the torque reaction of said brake band, and a one-way pressure distributing valve means for establishing communication between high pressure portions of said passage means and said reaction piston cavity while inhibiting distribution of pressurized fluid in the opposite direction.

3. In a friction brake adapted to anchor selectively a torque delivery element in a torque delivery gear system, a fluid pressure servo comprising a cylinder, a piston disposed in said cylinder and cooperating therewith to define a pressure chamber, a brake band surrounding a reaction element of said gear system and having an operating end and a reaction end, a mechanical connection between said piston and the operating end of said brake band, passage means for distributing control pressure to said chamber, modulator valve means disposed in and partly defining said passage means for controlling the rate of pressure build-up in said chamber, a reaction piston, a reaction cylinder receiving said reaction piston and cooperating therewith to define a reaction pressure cavity, said cavity being in fluid communication with pressure sensitive portions of said modulator valve means, means for transferring reaction force from the other end of said brake band to said reaction piston whereby the pressure in said reaction piston cavity is proportional to the torque reaction of said brake band, and a one-way pressure distributing valve means for establishing communication between high pressure portions of said passage means and said reaction piston cavity while inhibiting distribution of pressurized fluid in the opposite direction, said means for transferring reaction forces to said reaction piston comprising a brake lever mounted for oscillation on a stationary portion of said mechanism, one end of said lever being engageable with the reaction end of said brake band and the other end thereof being engageable with said reaction piston.

4. In a friction brake adapted to anchor selectively a torque delivery element in a torque delivery gear system, a fluid pressure servo comprising a cylinder, a piston disposed in said cylinder and cooperating therewith to define a pressure chamber, a brake band surrounding a reaction element of said gear system, a mechanical connection between said piston and one end of said brake band, passage means for distributing control pressure to said chamber, modulator valve means disposed in and partly defining said passage means for controlling the rate of pressure build-up in said chamber, a reaction piston, a reaction cylinder receiving said reaction piston and cooperating therewith to define a reaction pressure cavity, said cavity being in fluid communication with pressure sensitive portions of said modulator valve means, means for transferring reaction forces from the other end of said brake band to said reaction piston whereby the pressure in said reaction piston cavity is proportional to the torque reaction of said brake band, and a one-way pressure distributing valve means for establishing communication between high pressure portions of said passage means and said reaction piston cavity while inhibiting distribution of pressurized fluid in the opposite direction, said modulator valve means comprising a main valve element having a pressure area formed thereon that is in continuous fluid communication with a high pressure portion of said passage means, and a secondary plug valve engageable with said main valve element, one end of said plug valve being in fluid communication with said reaction piston cavity whereby reaction pressure forces may be transmitted through said plug valve to said main valve element.

5. A brake servo comprising a brake band with an operating end and a reaction end, a servo cylinder, a servo piston disposed in said servo cylinder and cooperating therewith to define a servo pressure chamber, a mechanical connection between said piston and said operating end of said brake band, pressure passage means communicating with said chamber, a modulator valve element disposed in and partly defining said passage means, a first pressure area on said valve element being in fluid communication with the high pressure portion of said passage means, a plug valve engageable with said valve element and adapted to transmit thereto forces that oppose the pressure forces acting on said pressure area, a reaction cylinder, a reaction piston in said reaction cylinder and cooperating therewith to define a reaction pressure cavity, the other end of said plug valve being in fluid communication with said reaction pressure cavity, and a mechanical connection between the reaction end of said brake band and said reaction piston whereby reaction forces are transmitted to said piston to establish a variation in pressure in said reaction cylinder, the resulting pressure force acting on said plug valve opposing the pressure force acting on said pressure area.

6. A brake servo comprising a brake band with an operating end and a reaction end, a servo cylinder, a servo piston disposed in said servo cylinder and cooperating therewith to define a servo pressure chamber, a mechanical connection between said piston and said operating end of said brake band, pressure passage means communicating wtih said chamber, a modulator valve element disposed in and partly defining said passage means, a first pressure area on said valve element being in fluid communication with the high pressure portion of said passage means, a plug valve engageable with said valve element and adapted to transmit thereto forces that oppose the pressure forces acting on said pressure area, a reaction cylinder, a reaction piston in said reaction cylinder and cooperating therein to define a reaction pressure cavity, the other end of said plug valve being in fluid communication with said reaction pressure cavity, a mechanical connection between the reaction end of said brake band and said reaction piston whereby reaction forces are transmitted to said piston to establish a variation in pressure in said reaction cylinder, the resulting pressure force acting on said plug valve opposing the pressure force acting on said pressure area, a one-way check valve means for establishing one-way fluid communication between high pressure portions of said passage means and said reaction pressure cavity whereby said cavity is charged with reaction pressure during initiation of the brake application, said check valve means inhibiting flow of pressure from said cavity during a brake operating cycle.

(References on following page)

References Cited
UNITED STATES PATENTS

| | | | |
|---|---|---|---|
| 2,764,263 | 9/1956 | Bricker | 188—152 |
| 2,849,086 | 8/1958 | Martin | 188—181 X |
| 3,108,493 | 10/1963 | Hause | 188—152 X |
| 3,128,846 | 4/1964 | Stelzer | 188—152 X |
| 3,155,040 | 11/1964 | Shurts et al. | |
| 3,261,432 | 7/1966 | Tournier | 188—152 X |

MILTON BUCHLER, *Primary Examiner.*

G. E. A. HALVOSA, *Assistant Examiner.*